(No Model.)
A. WEDEKIND.
DEVICE FOR STOPPING HORSES.
No. 381,735. Patented Apr. 24, 1888.
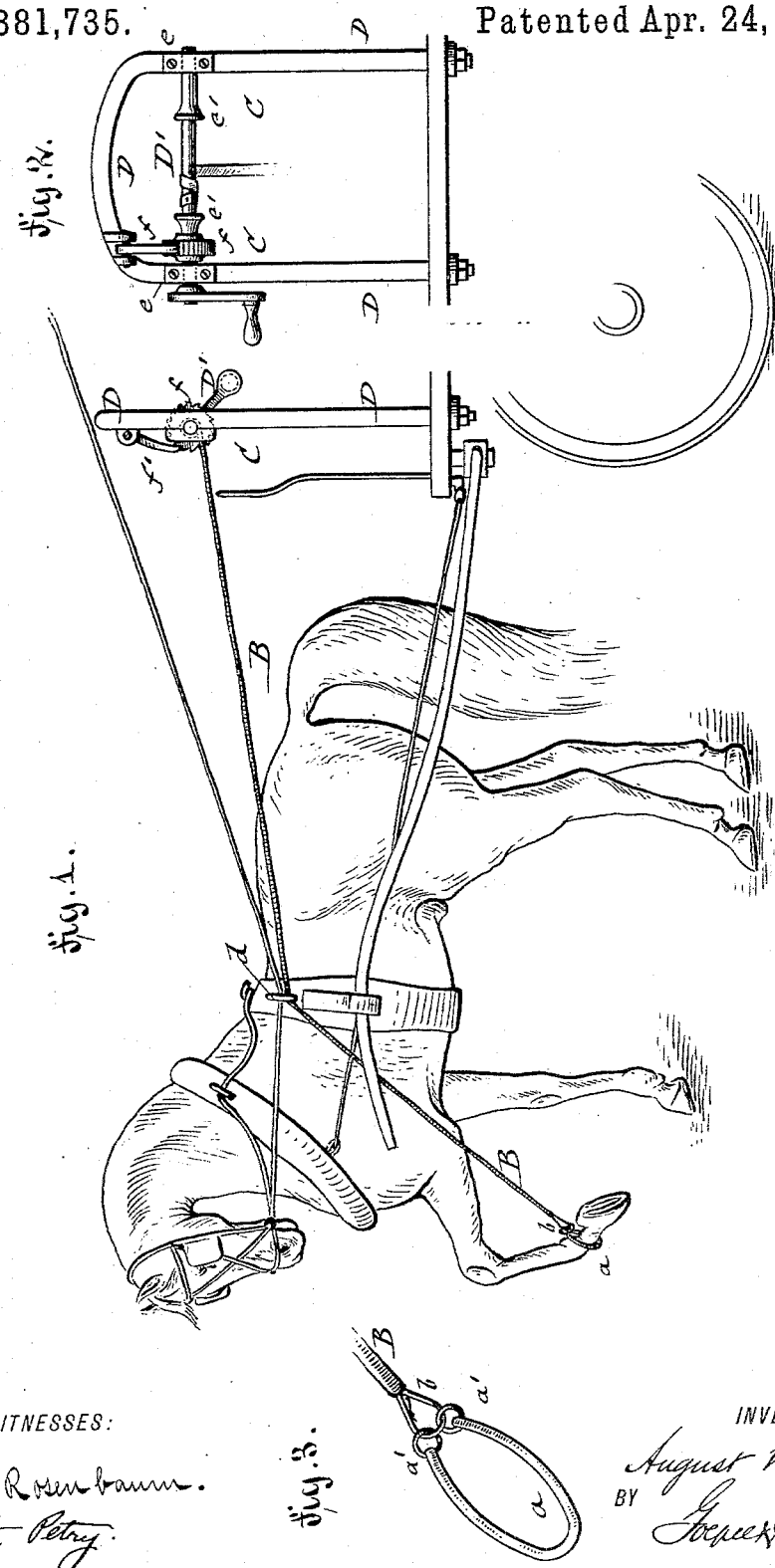
WITNESSES:
INVENTOR
August Wedekind
BY
ATTORNEYS.

United States Patent Office.

AUGUST WEDEKIND, OF BROOKLYN, NEW YORK.

DEVICE FOR STOPPING HORSES.

SPECIFICATION forming part of Letters Patent No. 381,735, dated April 24, 1888.

Application filed June 16, 1886. Renewed October 27, 1887. Serial No. 253,500. (No model.)

*To all whom it may concern:*

Be it known that I, AUGUST WEDEKIND, of Brooklyn, county of Kings, and State of New York, have invented certain new and useful Improvements in Devices for Stopping Runaway Horses, of which the following is a specification.

This invention has reference to an improved device for stopping runaway horses in an easy and effective manner; and the invention consists of a hopple or band attached to one of the front feet below the fetlock, a connecting-strap that is passed through one of the rein-guides, and a winding device supported on suitable bearings of the carriage-body, said winding device being provided with a pawl and ratchet or other check device, as will be more fully explained hereinafter, and finally pointed out in the claims.

In the accompanying drawings, Figure 1 represents a side view of my improved device for stopping runaway horses applied to a horse. Fig. 2 is a detail front view of the winding device; and Fig. 3 is a perspective view of the hopple or band applied to one of the front feet of the horse.

Similar letters of reference indicate corresponding parts.

Referring to the drawings, $a$ represents a hopple or band that is applied to the lower part of one of the front feet of the horse below the fetlock, and that is connected by rings $a'$ $a'$ at the ends to a spring-clasp, $b$, of a connecting-strap, B, that extends from the hopple or band $a$ through one of the rein-guides $d$ to a winding device, C, that is attached to the front part of the body of the carriage. The winding device C consists, preferably, of a yoke, D, of an inverted-U shape, that is attached to the bottom of the carriage-body back of the dash-board, and provided with bearings $e$ $e$ for a horizontal crank-shaft, D', to the middle part of which is attached the rear end of the connecting-strap B. The yoke may be dispensed with and the crank-shaft supported in bearings attached to the front part of the carriage or wagon. A ratchet-wheel, $f$, on the crank-shaft D' is engaged by a gravity-pawl, $f'$, pivoted to the yoke, so as to prevent the unwinding of the connecting-strap B when the same is wound up between the flanges $e'$ $e'$ on the crank-shaft D'. When the strap-winding device C is in its normal position, the connecting-strap B is not wound up on the crank-shaft D', but extended so as to form a loose connection with the hopple or band at the fore foot of the horse, so that the connecting-strap does not interfere with the motion of the foot. When the horse gets frightened and runs away, so as not to be within control, the handle of the crank-shaft D' is taken hold of and turned so as to wind up quickly a sufficient length of the connecting-strap, whereby the front foot is lifted, and thereby the horse rendered perfectly helpless and brought fully within control, as it has lost the control of one of its fore feet.

The device does not annoy the horse when in normal position, but brings it fully within control when drawn taut and wound up, so that the use of one of its fore feet is prevented.

When the harness is taken from the horse, the hopple or band is detached from the fore foot by means of the spring-clasp, and the connecting-strap with the band $a$ is then wound up entirely on the winding crank-shaft. When it is required for use again, the pawl is released, so as to permit the unwinding of the connecting-strap, which is then passed through the rein-guide, the hopple or band being then attached again to the fore foot of the horse by the spring-clasp.

The hopple or band, connecting-strap, and the winding device form thereby a reliable check device for controlling horses in case they run away, and protecting thereby the persons riding in the carriage.

When the device is to be applied for use with two horses, the bands are applied to the right-hand fore foot of the left-hand horse and the left-hand fore foot of the right-hand horse, while the connecting-straps of both feet are wound up on the same crank-shaft.

Having thus described my invention, I claim as new and desire to secure by Letters Patent—

1. The combination, with a hopple or band adapted to be applied to one of the fore feet of the horse below the fetlock, a connecting-strap attached to said hopple or band, and a rein-guide through which said connecting-strap is passed, and a windlass on the wagon-body, substantially as set forth.

2. The combination of a hopple or band applied to the fore foot of the horse below the fetlock, a connecting-strap attached by a spring clasp to rings of the band, a rein-guide for supporting the connecting-strap, and a windlass having a pawl-and-ratchet mechanism on the wagon-body, substantially as set forth.

In testimony that I claim the foregoing as my invention I have signed my name in presence of two subscribing witnesses.

AUGUST WEDEKIND.

Witnesses:
PAUL GOEPEL,
MARTIN PETRY.